United States Patent [19]

Lunden et al.

[11] 4,253,787
[45] Mar. 3, 1981

[54] LUMBER STACKING APPARATUS

[76] Inventors: Sidney L. Lunden; Robert E. Ulrich, both of E. 12205 Empire Way, Spokane, Wash. 99206

[21] Appl. No.: 29,631

[22] Filed: Apr. 13, 1979

[51] Int. Cl.³ ............................................. B65G 57/26
[52] U.S. Cl. ......................................... 414/42; 414/83
[58] Field of Search ...................... 414/42, 83, 85, 82, 414/84

[56] References Cited

U.S. PATENT DOCUMENTS

| 1,490,594 | 4/1924 | De Lateur | 414/42 X |
| 2,861,702 | 11/1958 | Mason | 414/85 X |
| 3,738,510 | 6/1973 | Mason | 414/42 X |
| 3,860,128 | 1/1975 | Lunden | 414/42 |
| 3,901,391 | 8/1975 | Carlson et al. | 414/85 X |
| 3,904,044 | 9/1975 | Lunden | 414/42 X |
| 3,904,047 | 9/1975 | Lunden | 414/42 |

Primary Examiner—Leslie J. Paperner
Attorney, Agent, or Firm—Wells, St. John & Roberts

[57] ABSTRACT

A lumber stacking apparatus for successively placing layers of boards one on another to form a vertical stack, and for automatically placing stickers between successive layers of boards to vertically separate the layers within the stack. The successive layers of boards are formed along a layer support surface adjacent the stack. A forked arm assembly is raised to lift the formed layer from the layer support and carry the lifted layer to the stack and deposit the layer on the stack. The stickers are initially moved transverse to the movement of the fork arms to selected sticker positions. The stickers are then lifted up and over sticker supports provided on the sides of the fork arms. As the fork arms are raised to lift of layer of boards from the layer support surface, the sticker supports simultaneously lift a layer of stickers against the bottom side of the board layer. Both layers are then moved outward over the stack, lowered, and stripped from the fork arms and sticker supports onto the stack as the fork arms are drawn back past stripping surfaces. The stripping surfaces are vertically movable in response to movement of the fork arms between positions clear of the layers to allow outward movement of the layers over the stack, and positions intersecting the paths of the layers as the fork arms are retracted.

15 Claims, 14 Drawing Figures

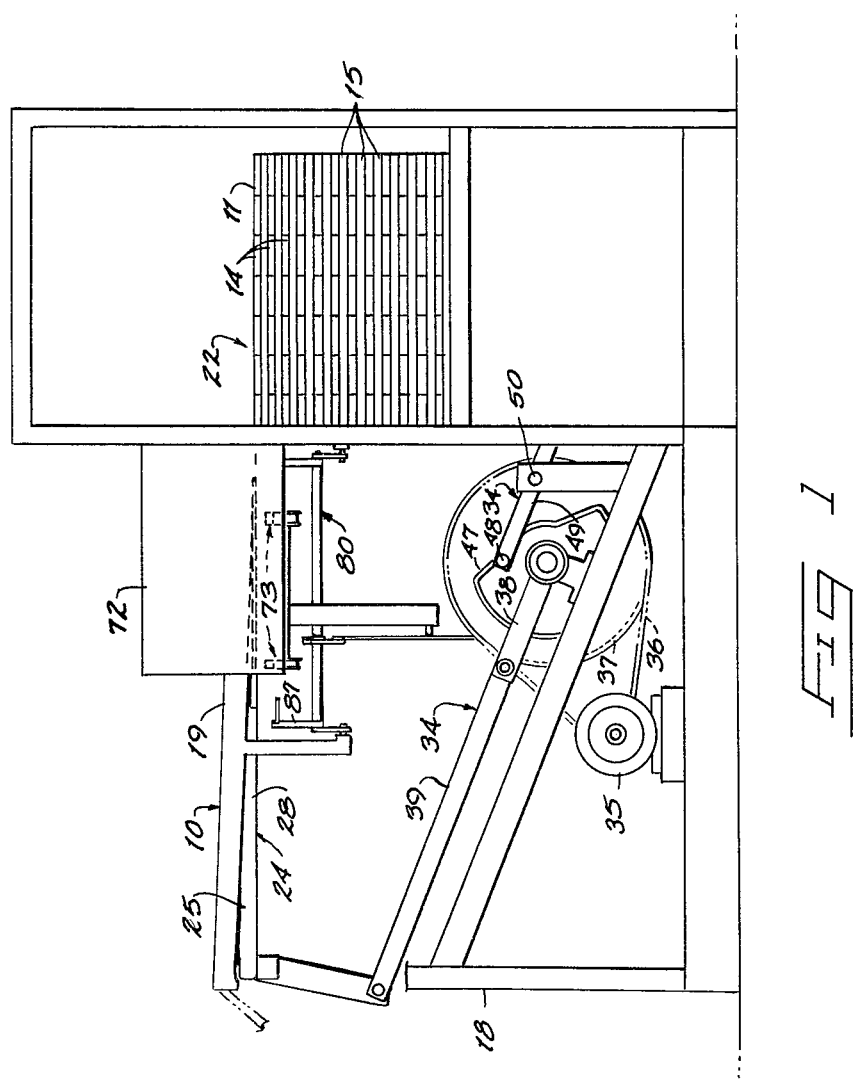

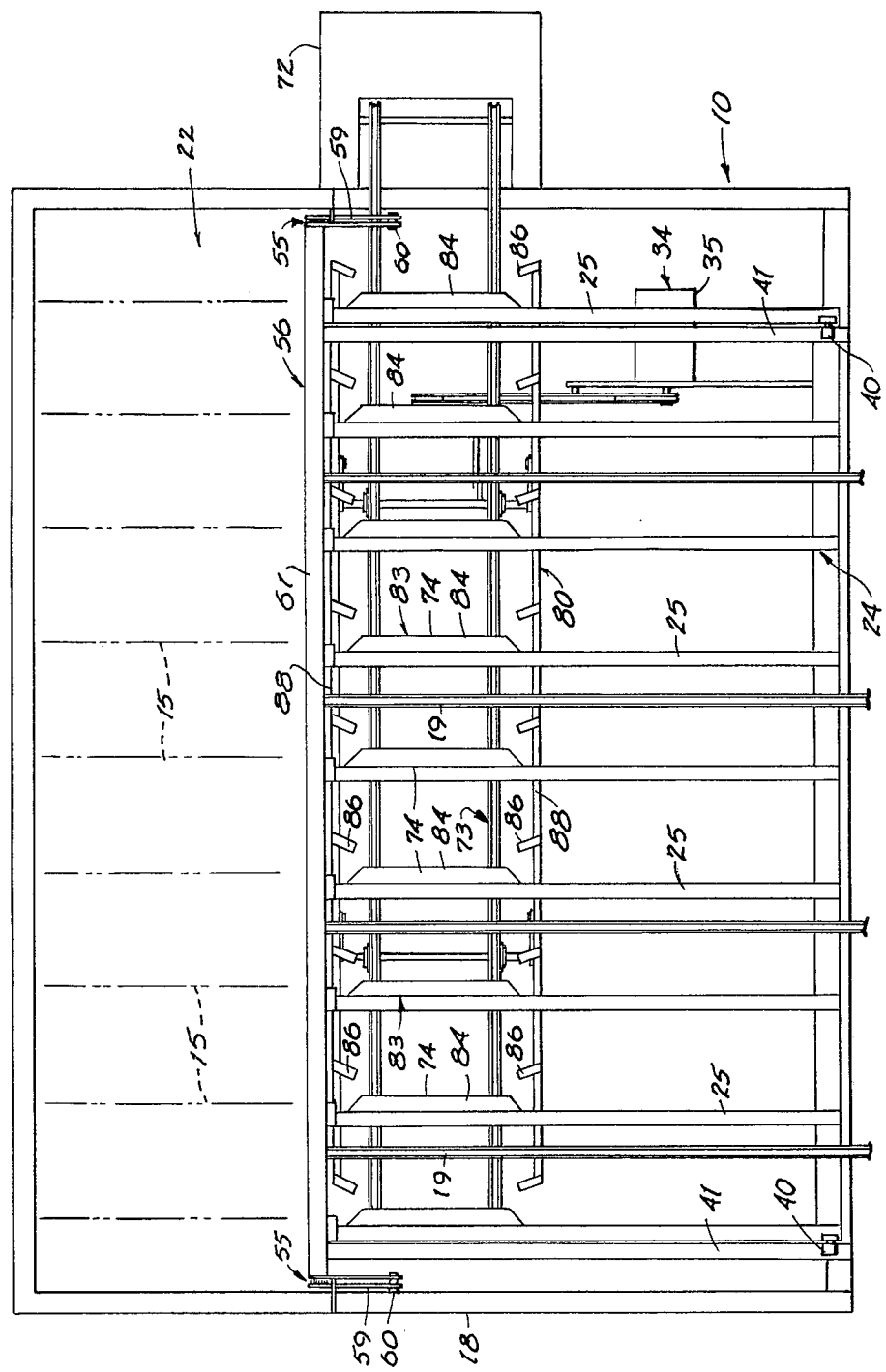

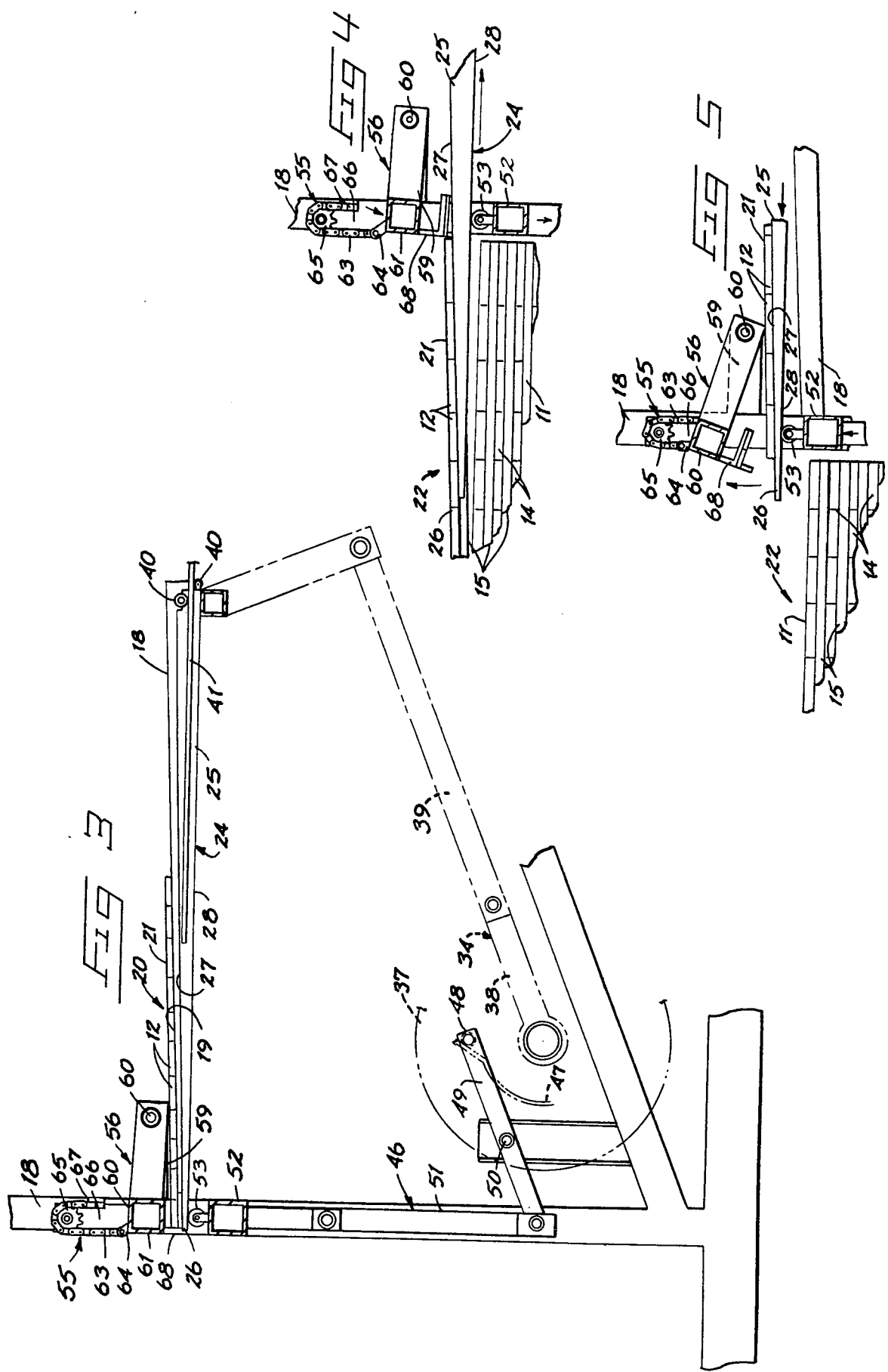

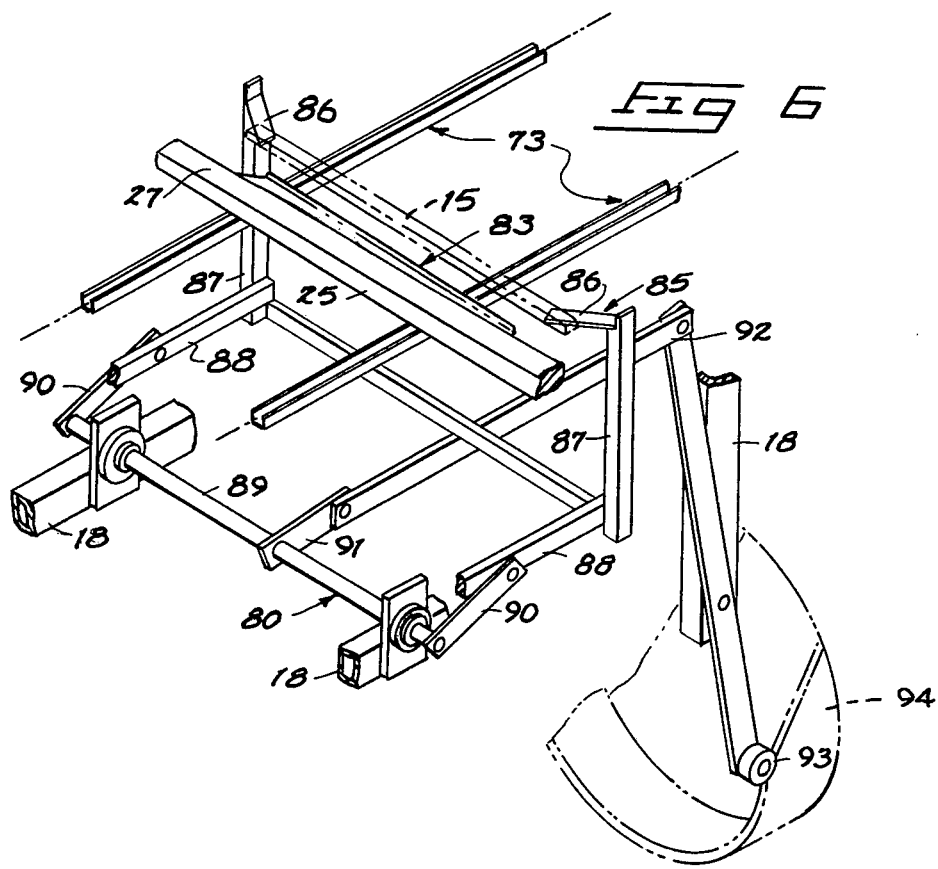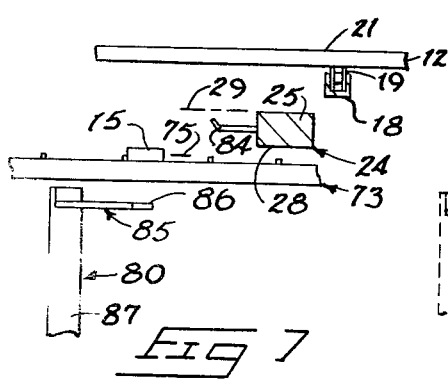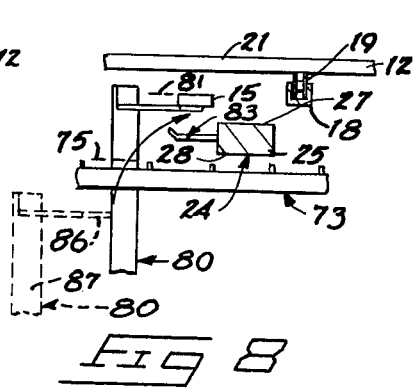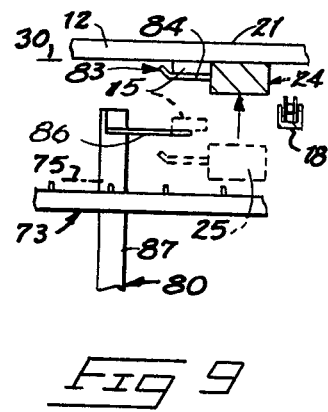

LUMBER STACKING APPARATUS

BACKGROUND OF THE INVENTION

The present invention is related to automatic lumber stacking apparatus with layer spacing stickers situated between the layers of boards.

In the lumber industry, boards that have been freshly cut from logs are generally sorted and stacked for drying in a dry kiln. During the stacking operation, stickers or elongated wooden slats are placed transversely between layers at spaced intervals. Usually, the stickers have lengths equal to the width of the stack and are situated transverse to the boards in the stack. The stickers are spaced at longitudinal intervals along the layers of boards to separate the layers and enable drying gases within the kiln to circulate through the stack and uniformly dry the boards.

In many stacking operations today, stickers are placed manually between the layers of boards. Such manual placement of stickers is costly, tedious and often dangerous.

Automatic sticker placing equipment has been developed although many such forms of this equipment can only be justified in the largest of operations. Most existing automatic sticker placing apparatus include individual sticker magazines adajcent each sticker placement station for storing the stickers to be placed between layers of boards. Loading these magazines often requires the full attention of at least one worker while another is required to operate the stacking machine. Furthermore, it is frequent that such magazines are situated adjacent one side of the stack that is opposite to the lumber stacking apparatus. Therefore, such placement apparatus requires additional space and operating equipment.

U.S. Pat. No. 3,904,044 granted to applicant, Sidney L. Lunden, on Sept. 9, 1975 describes a sticker placing device for lumber stacking apparatus that automatically delivers stickers from a single magazine to successive locations along the length of a layer of boards. The sticker magazine and sticker indexing conveyor are located behind the stacking apparatus and require additional intermediate handling prior to placement beneath a layer being carried to the stack. The selected group of spaced stickers is lifted from the rear sticker supply conveyor and moved forward to an intermediate position between the sticker conveyor and the lumber stack. Then, in another step, the stickers are lifted to spaced locations below a layer of boards and finally transferred over and onto the stack. This apparatus is entirely effective and greatly reduces the necessary equipment and space previously required for auxiliary automatic sticker placing apparatus.

However, the applicant has discovered a substantial improvement which greatly simplifies the apparatus and increases the sticker placement reliability. Such improvement is the subject of this application. Additionally the lumber stacking machine is produced with fewer component parts and will operate in a relatively smaller area.

BRIEF DESCRIPTION OF THE DRAWINGS

A preferred form of the present invention is illustrated in the accompanying drawings in which:

FIG. 1 is a diagrammatic side elevational view of the subject stacking apparatus from the end of a lumber stack;

FIG. 2 is a plan view of the apparatus illustrated in FIG. 1;

FIG. 3 is an enlarged fragmentary diagrammatic view illustrating a layer handling means and overhead strip means of the present apparatus;

FIG. 4 is a fragmentary diagrammatic view illustrating operation of the layer handling means and strip means for the present invention;

FIG. 5 is a view similar to FIG. 4 only showing different operational positions of the elements therein;

FIG. 6 is a diagrammatic pictorial view of a sticker transfer means for the present invention;

FIG. 7 is a diagrammatic operational view of the sticker transfer means;

FIG. 8 is a view similar to FIG. 7 only showing different operational positions of the elements therein;

FIG. 9 is an operational view similar to FIGS. 7 and 8 only showing another operational view of the elements therein;

DETAILED DESCRIPTION OF A PREFERRED EMBODIMENT

Figure 10:
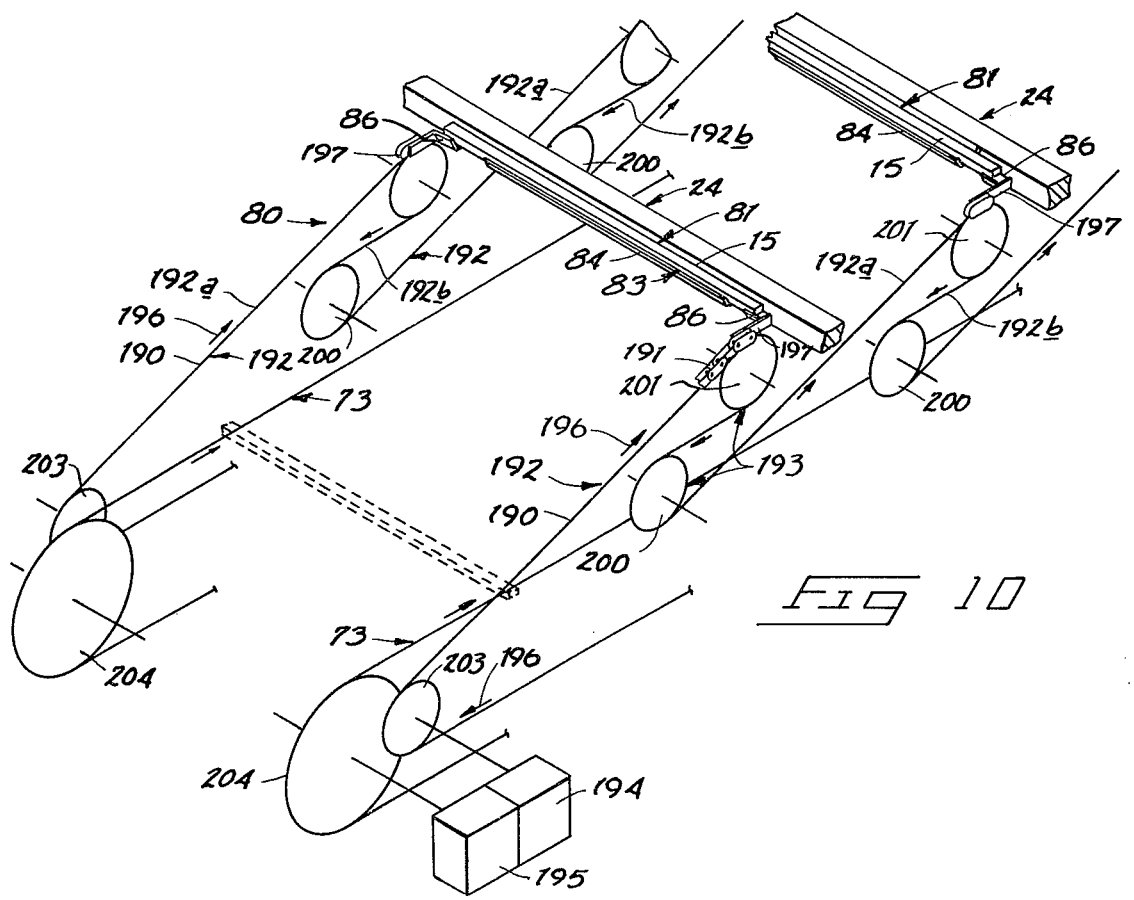
FIG. 10 is a diagrammatic fragmentary pictorial view of an alternate form of the sticker transfer means.

The present lumber stacking apparatus is illustrated in the accompanying drawings as generally indicated therein by the reference character 10. The apparatus is utilized to automatically form a stack 11 of a plurality of boards 12. The stack 11 is arranged with the boards being in parallel longitudinal orientations in layers 14. The layers 14 may be separated by selected layers of stickers 15.

The stickers 15 are arranged transversely to the longitudinal orientation of the boards within the stack. They extend from one longitudinal side of the stack to the other and are spaced at selected locations along the length of the stack. The stickers 15 provide spaces between adjacent board layers 14 to enable the boards to dry more evenly.

The present apparatus 10 includes an upright rigid frame 18. Along an upward side of the frame 18 is a layer support surface 19. This surface 19 is situated laterally adjacent to the top surface of the stack 11. Successive boards are delivered, moving in a direction transverse to their lengths onto the support surface 19 through appropriate conveying mechanisms that are well known in the industry. A layer 14 of boards is eventually formed at a layer pickup station 20 along the support surface 19. Such a layer is indicated at 21 in FIGS. 3, 4 and 5.

The apparatus 10 will function automatically to move the layer 21 from the layer pickup station 20 upwardly and outwardly to a stacking station 22 directly above the top surface of the stack 11. The layer 21 is then stripped onto the stack 11. As will be described below, a layer of stickers 15 is deposited simultaneously with the layer 21.

The successive layers of boards 12 are moved between the layer pickup station 20 and stacking station 22 by a layer handling means 24. The layer handling means 24 is mounted on the frame for moving upward at the layer pickup station 20 from a first elevation 29 (see FIG. 7) to a second elevation 30 (FIG. 9) above the support surface 19 to pick up layer 21. The means 24 then functions to move the lifted layer from the pickup station 20 to the layer stacking station 22. At the stacking station 22, the handling means 24 moves downwardly to deposit the lifted layer 21 onto the previously deposited layer. Finally, the handling means 24 returns from the stacking station to the pickup station 20 in preparation for receiving and handling the next successive layer.

In a preferred embodiment the layer handling means 24 includes a forked arm structure 25 that is supported for reciprocating and vertical movement on the framework 18. The forked arm structure 25 extends forwardly toward the stack 11 to free outer arm ends 26. The arms are inclined, each including an upper surface 27 for engaging a layer of boards 21 and a planar bottom surface 28 which may be inclined but preferably is horizontal.

A drive means 34 is provided for moving the layer handling means 24 between the layer pickup station 20 and the layer stacking station 24. It may include a motor 35 (FIG. 1) operatively connected to an appropriate linkage 36. Linkage 36 is operatively engaged with a sprocket 37 journalled on the framework. A crank 38 is turned by the sprocket 37 in response to operation of the motor 35. A connecting link 39 extends between the crank 38 to a pivoted connection on the forked arm structure 25.

Upwardly adjacent the connection of link 39 and forked arm structure 25 are rollers 40 (FIG. 3). The rollers 40 are rotatably mounted to the forked arm structure 25 and are guided along a set of tracks 41 on frame 18. The rollers and tracks facilitate smooth reciprocating motion of the forked arm structure 25 while allowing upward pivotal movement of the free fork arm ends 26.

A vertical drive means 46 (FIGS. 3-5) is supplied for raising the free ends 26 of the forked arms while the forked arm structure is located at the layer pickup station 20. The surfaces 27 on the structure 25 are moved upward to engage and lift the layer of boards to the second elevation 30 (FIG. 9).

The vertical drive means 46 which causes timed elevational movement of the fork arms 25 may include a cam 47 that is mounted to the sprocket 37. A follower 48 supplied at the lower end of an elongated rocker arm 49 pivots at 50 in response to relative movement of the cam surface. A vertical connecting link 51 is pivotally connected between an opposite end of the rocker arm 49 and a cross beam 52. Rollers 53 are provided on the cross beam 52 for engaging the bottom surface 28 of the fork arms and lifting the forked arms when the cross beam 52 is moved upward.

The vertical movement of the cross beam 52 is timed in relation to the operation of the drive means 34 such that the fork arms are elevated at the layer pickup station 20 and are held at that elevation as the fork arms are moved toward the stacking station 22. The arms are then lowered through means 46 at the stacking station 22 and are held in the lowered position as the fork arms moved back to the initial position.

An overhead stripping means 56 (FIGS. 3-5) is utilized in conjunction with the vertical drive means 46 and drive means 34. Means 56 moves vertically intermediate the layer pickup station 20 and the layer stacking station 22. The overhead stripping means 56 functions to move upward from a strip position (FIG. 4) that corresponds to the first elevation, to a clear position (FIG. 5) above the second elevation. When the stripping means is elevated above the second elevation, then the layer handling means may pass freely thereunder to the layer stacking station 22.

After the layer handling means 24 has moved to the layer stacking station 22, the stripping means 56 is moved downward from the clear position to the strip position. This is accomplished while the layer handling means 24 is at the stacking station 22 and as it is moved rearward to the layer pickup station. The layer of boards is thereby stripped onto the stack as the boards come into abutment with the overhead stripping means 56.

The stripping means 56 is responsive to vertical movement of the layer handling means 24 and will move vertically a distance that is greater than the vertical distance between the first and second elevations 29 and 30. This allows direct abutment between the layers 14 and stripping means 56 at the strip position and ample clearance between the stripping means 56 and layer at the clear position.

Overhead stripping means 56 includes a stripper drive means 55 for vertically moving means 56 a distance equal to a multiple of the distance between first elevation 29 and second elevation 30. Drive means 55 may be integrated with the vertical drive means 56 and drive means 34 or it may be independently operated by appropriately timed drive mechanisms (not shown).

Means 55 preferably includes an arm 59 that is supported by the cross beam 52. Pivot 60 provides an axis about which a stripper cross bar 61 will pivot in response to vertical movement of the cross beam 52. A chain 63 extends from a bracket 64 on cross bar 61 upwardly over a sprocket 65. The sprocket 65 is rotatably mounted to a bracket 66 on the strip cross bar 61. The opposite end of the chain is affixed to a stationary bracket 67 on frame 18. Thus, as the cross beam 52 is elevated, so is the strip cross bar 61. The elevational movement of the strip cross bar is at a faster rate than the cross beam 52 because of the sprocket and chain arrangement described above. For example, a vertical movement of one inch for cross beam 52 may result in a corresponding vertical movement of the strip cross bar 61 of approximately two inches.

It may be understood through the above described interconnection of the vertical drive means 46 and overhead stripping means 56 that the stripping means 56 will be moved to the clear position as the fork arms are elevated to engage and lift a layer of boards. They will be lowered as the fork arms are lowered toward the stack at the stacking station. Stripping surfaces 68 are provided along the strip cross bar 61 which come into abutment with the boards as the fork arms are lowered and retracted.

As briefly discussed above, stickers are automatically placed between the successive layers of boards in response to operation of the above described stacking apparatus. Stickers are delivered across the frame from a sticker magazine 72 which is diagrammatically illustrated in FIG. 1. The magazine is located adjacent one end of a layer 21 at the layer pickup station 20. Individual stickers are supplied from the magazine 72 and are carried underneath the layer support surface 19 across the width of the framework by a sticker indexing conveyor means 73.

Means 73 is utilized to receive a plurality of stickers from the magazine 72 and distribute them to a multiplicity of spaced sticker stations 74 at the layer pickup station 20. The number of sticker stations 74 corresponds to the number of desired sticker intervals located at longitudinally spaced locations beneath the layer support surface 19. The stickers are initially located at a third elevation 75 (FIGS. 7-9) along the operative flight of the indexing conveyor means 73. The third elevation 75 as shown in FIGS. 7 and 10-14 is below the first elevation 29.

The sticker indexing conveyor means, except for its position in relation to the fork arm structure 25, is substantially identical to that disclosed in U.S. Pat. No. 3,904,044 granted to applicant, Sidney L. Lunden, on Sept. 9, 1975. Detailed description relating to the sticker magazine and indexing conveyor means within that patent are hereby incorporated by reference into the present application.

Figure 11:
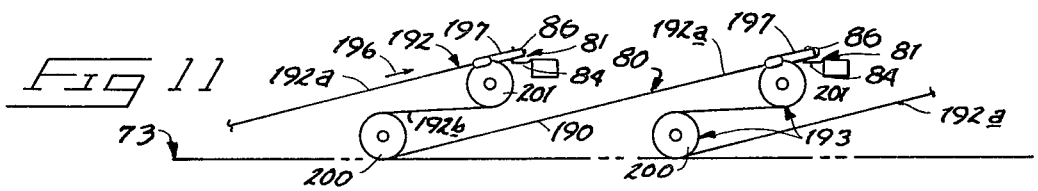
FIGS. 11-14 are operational views diagrammatically illustrating the alternate sticker transfer means shown in FIG. 10.
Figure 12:
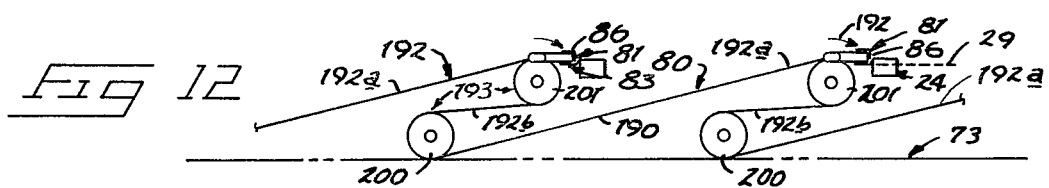

Two forms of sticker transfer means are shown generally at 80 in FIGS. 6-9 and 10-14 for lifting stickers at the selected sticker stations upward from the third elevation 75 to a sticker transfer position 81 (FIGS. 8, 11 and 12). The transfer position is located at the first elevation 29 (FIG. 12) or intermediate the first and second elevations 29 and 30 (FIG. 8).

The sticker transfer means 80 is operative in response to layer handling means 24 to deliver stickers to a sticker holding means 83. The sticker holding means 83 in a preferred embodiment is simply a series of laterally projecting sticker supports or brackets 84 on the sides of individual forks 25. Supports 84 are elongated tray shaped members that are of a width substantially equal to the width of the stickers. They are spaced elevationally below the surface 27 of the individual arms 25 by a distance substantially equal to the thickness of the stickers. Therefore, a sticker held within the sticker support will be moved, along with the fork arms, into frictional engagement with the bottom surface of a layer 21 at the layer pickup station.

Sticker transfer means 80 includes a sticker lifting means 85 for removing the stickers from the elongated endless conveyor 73 at the sticker stations (at third elevation 75) and moving the stickers upward and into the upward path of the sticker supports 84. Means 85 includes sticker end supports 86 that are situated at opposite sides of the indexing conveyor means 73 and intersect the path of stickers moving on conveyor means 73 adjacent the selected sticker station. The end supports 86 are also spaced apart to clear the complementary sticker supports 84 as they are moved to bring stickers to the transfer position 81.

The end supports 86 of the FIGS. 6-7 version are mounted on upright posts 87. The posts 87 are affixed to horizontal link members 88 (FIG. 6). Pivot shafts 89 are provided on the framework 18 and pivotally mount the links 88 through a crank arm connection 90. A rigid connection is maintained between the crank arms 90 and pivot shafts 89 so that pivotal movement of the shafts 89 about their axes will cause corresponding arcuate movement of the links 88.

Vertical arcuate motion of the sticker lifting means 85 shown in FIGS. 6-9 may be accomplished by independent drive mechanisms (not shown) or preferably by a second crank arm 91 connected through a drive linkage 92 to a cam 93 and follower 94. Rotational movement of the cam 94 on sprocket 37 will cause pivotal movement of the drive link and corresponding pivotal movement of the interconnected pivot shafts 89. The horizontal links 88 will thereby pivot in an upward arc while maintaining their horizontal orientation. Like motion is transmitted to the end supports 86 which move to the third elevation 75. There they engage the ends of stickers and lift them upwardly and laterally to the transfer position 81 directly above the holding means 83. The stickers are held at the transfer position until the fork arms are elevated, along with the holding means 83 to lift the stickers upward to engage and lift a layer of boards from the layer pickup station 20.

Operation of the sticker transfer means 80 may be timed in relation to operation of the layer handling means 24. Specifically, it is preferred in the embodiment illustrated in FIGS. 6-9 that the cam 94 be designed to cause upward motion of the sticker end supports 86 while the fork arms are being retracted to strip the previous layer of boards and stickers onto the stack. The stickers are therefore ready to be elevated with the fork arms as the return stroke is completed. Then the arms may again be elevated to engage the stickers and the next successive layer of boards. This operation is shown sequentially in FIGS. 7 through 9.

In FIG. 7 the layer handling means is situated outwardly over the stack and is beginning its rearward movement to the layer pickup station. As this happens, the sticker lifting means 85 functions to lift the sticker upwardly and laterally to the sticker transfer position 81 shown in FIG. 8. Then, as the layer handling means 24 is elevated to engage the next successive layer, the holding means 83 is simultaneously elevated to engage the sticker and lift it from the end supports 86 into engagement with the bottom of the upwardly adjacent layer.

The second form of the sticker transfer means 80 is illustrated in FIGS. 10 through 14 which correspond somewhat with FIGS. 6-9 which show the first form of means 80. FIG. 10 diagrammatically illustrates the alternate form of transfer means 80 in conjunction with the sticker indexing conveyor means 73. FIGS. 11 through 14 illustrate operation of the alternate form.

The FIGS. 10 through 14 version of sticker transfer means 80 includes a pair of elongated conveyor members 190 that extend along opposite longitudinal sides of the sticker indexing conveyor means 73. The conveyor members 190 are preferably comprised of endless, roller type chains 191. The chains are movable in circuitous paths 192 that are defined by idler means 193. The paths 192 include a series of upward flights 192a and a like number of downward flights 192b. The flights 192a and 192b of the circuitous paths 192 are numbered in correspondence to the number of sticker stations to be utilized. The flights are located along the length of the sticker indexing means 73 in relation to the desired sticker spacing.

A drive means 194 is provided that may be integral with a drive means 195 for the indexing conveyor means 73 or may be separate therefrom. The drive means 194 is operated in response to operation of the index conveyor means so that it may receive and move stickers therefrom to the sticker transfer positions. Drive means 194 operates to move the chains 191 in the direction indicated in FIGS. 10 through 14 by the arrows 196.

Sticker end supports 86 are mounted to the chains 191 through elongated brackets 197. The brackets are mounted to inwardly facing sides of the chains and the end supports 86 protrude inwardly therefrom. The end supports 86 of this version are slightly angulated to accommodate angular motion of the brackets as the chains 191 are trained about the idler means 193.

The idler means 193 is comprised of a mutliplicity of first sprockets 200 rotatably mounted to the framework adjacent the stickers on the indexing conveyor means 73. Second ideler sprockets 201 are also rotatably mounted to the framework above the first ideler sprockets and adjcent to the stricker transfer positions 81. The chains 191 are trained upwardly over the second sprockets, then down and rearwardly over the first sprockets and subsequently back upwardly over the next successive second sprockets in the circuitous path 192. The resulting motion of the sticker end supports 86 as they move along the paths 192 is illustrated in FIGS. 11 through 14.

FIGS. 11 and 12 illustrate two alternate positions for the end supports 86 to assume as sticker transfer positions 81. In FIG. 11, the end supports may be brought to a position over the second sprockets and substantially directly above the sticker supports 84 on the fork arm arrangements 25. They may be held in position through appropriate control of the drive means 194 until the fork arms are lifted upwardly to bring the supports 84 into engagement with the stickers. In FIG. 12, the drive means 194 has been appropriately controlled to allow further movement of the end supports around the second sprockets to move the end supports down past the sticker supports 84. This effectively transfers support of the sticker from the end supports 86 to the supports 84. In this manner, the transfer position is effectively changed to a position in coincidence with the first elevation 29.

Figure 13:
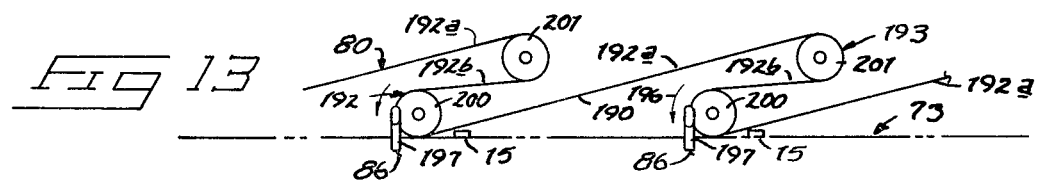
Figure 14:
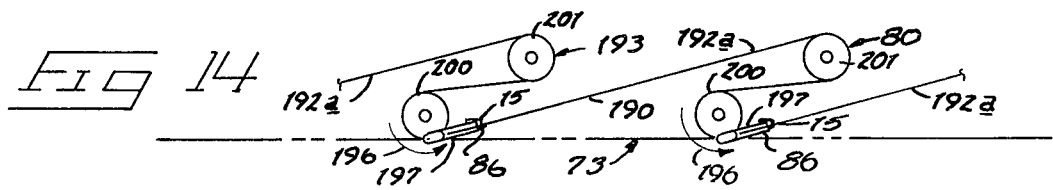

During operation a first set of stickers are delivered to the holding means 83. While the layer handling means is delivering the first set of stickers and a layer of boards to the stack, the sticker indexing conveyor means and sticker transfer means may be operated. The layer handling means and sticker indexing conveyor means operate in conjunction with one another to bring the next successive group of stickers into position at or adjacent to the sticker transfer positions. Here the sticker end supports 86 are moved back along the downward portions 192b of the circuitous paths 192 and through adjacent stickers on the indexing conveyor means 73 as illustrated in FIG. 13. The movement of the chains 191 is correlated through the drive means 194 with movement of the sticker indexing conveyor means 73. This is done so the end supports 86 will move between adjacent stickers on the conveyor and then subsequently move back upwardly along the upward portions 192a of the paths 192 to engage and lift a selected sticker upwardly toward the transfer positions.

The drive means 194 may include an appropriate drive sprocket at 203 that may be driven on the same shaft as a drive sprocket 204 for the sticker indexing conveyor means 73. Independent drive mechanisms (not shown) may also be utilized to operate, in response to operation of the sticker indexing conveyor means 73, to move selected stickers to the sticker transfer positions.

A distinct advantage of the present arrangement over prior automatic sticker placing apparatus is the reduction in handling of the stickers prior to placement within the stack. The stickers need only be (1) moved to selected positions below the fork arms; (2) raised to transfer positions above the sticker holding means; and (3) moved by the holding means onto the stack. The intermediate step previously used in moving stickers from the indexing conveyor to an intermediate holder has been eliminated, along with the added equipment and space required.

It is to be understood that the above description is given by way of example and that various changes and modifications may be made therein without departing from the scope of my invention. The following claims are set forth to define the scope of my invention.

What I claim is:

1. A lumber stacking apparatus for forming a stack of boards having a plurality of superimposed layers of elongated boards, in which selected layers are separated by stickers that are oriented transversely to the elongated dimension of the boards at desired sticker intervals along the length of the boards, said apparatus comprising:
    a frame;
    an elevated layer support surface disposed on the frame at a layer pickup station for supporting a layer of elongated boards thereon;
    a layer handling means movably mounted on the frame for sequentially (1) moving upward at the layer pickup station from beneath the layer support surface to an elevation above the layer support surface to lift a layer of boards from the layer support surface; (2) moving the lifted layer from the pickup station to a layer stacking station; (3) moving downward and depositing the lifted layer at the layer stacking station on a preceding layer; and (4) returning from the layer stacking station preparation for handling a succeeding layer;
    a sticker magazine means adjacent the frame for storing a plurality of stickers;
    elongated sticker indexing conveyor means mounted on the frame and extending alongside the stack directly below the layer handling means at the layer picking station between the sticker magazine and a plurality of spaced sticker stations corresponding to the desired sticker intervals for receiving a plurality of stickers from the sticker magazine means and distributing the stickers individually to the spaced sticker stations;
    sticker holding means associated with the layer handling means for moving in an upward path in response to the upward movement of the layer handling means for receiving stickers and carrying the stickers underneath the lifted layer in response to the movement of the layer handling means from the pickup station to the layer stacking station and depositing the stickers on the preceeding layer to separate the lifted layer from the preceeding layer on the stack; and
    sticker transfer means movably mounted on the frame and responsive to the layer handling means for lifting the stickers from the sticker indexing conveyor vertically upward and into the vertical path of the sticker holding means in timed relationship with the movement sticker holding means to transfer the sticker from the sticker indexing conveyor to the sticker holding means.

2. The lumber stacking apparatus as defined in claim 1 wherein the sticker holding means includes supports affixed to the layer handling means for movement therewith that engage and support the stickers underneath the lifted layer.

3. The lumber stacking apparatus as defined in claim 1 wherein the layer handling means includes a forked arm structure having a plurality of fork arms that extend forward for lifting the layer of boards from the layer support surfaces and carrying the layer from the layer pickup station to the layer stacking station and wherein the sticker holding means includes a sticker support alongside each fork arm for engaging the stickers and carrying the stickers upward and holding the stickers against the underside of the layer as the layer is carried from the layer pickup station to the layer stacking station.

4. The lumber stacking apparatus as defined in claim 1 wherein the sticker transfer means includes sticker lifting means pivotally mounted on the frame for removing the stickers from the elongated endless conveyor and pivoting the stickers upward and laterally into the upward path of the sticker holding means.

5. The lumber stacking apparatus as defined in claim 4 wherein the sticker lifting means includes end supports that are pivotally mounted for engaging the stickers at their ends and for removing the stickers from the elongated endless conveyor and pivoting the stickers upward into the upward path of the sticker holding means.

6. The lumber stacking apparatus as defined in claim 1 further comprising drive means operatively connected to the layer handling means for moving the layer handling means between the layer pickup station and the layer stacking station and wherein the sticker transfer means is operatively connected to the drive means for moving the stickers upward while the layer handling means is returning from the layer stacking station to the layer pickup station.

7. The lumber stacking apparatus as defined in claim 1 further comprising an overhead stripping means mounted on the frame for movement intermediate the layer pickup station and the layer stacking station for (1) moving upward from a strip position to a clear position while the layer handling means is at the layer pickup station to enable the layer handling means to pass thereby when the layer handling means moves to the layer stacking station and (2) moving downward from the clear position to the strip position while the layer handling means is at the layer stacking station to strip the layer and the stickers from the layer handling means and the sticker holding means when the layer handling means returns to the layer pickup station.

8. The lumber stacking apparatus as defined in claim 7 wherein the overhead stripping means is responsive to the vertical movement of the layer handling means and wherein the overhead stripping means including drive means for moving the overhead stripping means upward and downward at a rate faster than the upward and downward movement of the layer support means.

9. The lumber stacking apparatus as defined in claim 1 wherein the layer handling means includes a forked arm structure having a plurality of forked arms that extend forward to free ends for engaging and lifting the layer of boards from the layer support surface and carrying the layer from the layer pickup station to the layer stacking station;

wherein the sticker holding means is mounted to the forked arms; and wherein the apparatus further comprises vertical drive means for raising the free ends of the forked arms while the forked arm structure is at the layer pickup station to pick up a layer of boards and further comprising stripping means mounted on the frame overlying the free ends of the forked arm structure when the forked arm structure is at the layer pickup station and responsive to the vertical movement of the free ends for moving upward to a clear position to enable the forked arm structure to carry a layer to the layer stacking station and moving downward to a strip position to strip the layer and stickers from the forked arm structure when the forked arm structure is returned to the layer pickup station.

10. Sticker placing apparatus for use in conjunction with a layer handling apparatus for forming a stack of boards having a plurality of superimposed layers of elongated boards, in which selected layers are separated by stickers that are oriented transversely to the elongated dimension of the boards at desired sticker intervals along the length of the boards, said sticker placing apparatus comprising:

a frame adjacent the stack;

a sticker magazine means mounted on the frame for storing a plurality of stickers;

an elongated sticker indexing conveyor mounted on the frame and extending from the sticker magazine along one side of the stack to a plurality of spaced sticker stations corresponding to the desired sticker intervals for receiving a plurality of stickers from the magazine means and distributing the stickers individually to the sticker stations alongside the stack;

a sticker transfer means movably mounted on the frame and responsive to the layer handling apparatus for removing the distributed stickers from the elongated sticker indexing conveyor and lifting the stickers upward and laterally to sticker transfer positions in which the stickers are positioned transverse to the elongated dimension of the boards in the stack; and sticker holding means movably mounted on the frame and responsive to the layer handling apparatus for receiving the stickers at the sticker transfer positions and moving the stickers longitudinally forward over the stack and depositing the stickers between the selected layers of boards.

11. The sticker placing apparatus as defined in claim 10 wherein the sticker transfer means includes pivotally mounted sticker lifting means for removing the stickers from the elongated conveyor and pivoting the stickers upward and laterally into the sticker transfer positions.

12. The sticker placing apparatus as defined in claim 10 wherein the sticker holder means are mounted on a forked arm structure for movement therewith in which the forked arm structure is movably mounted for forward and back movement to and from over the stack to carry the stickers.

13. A lumber stacking apparatus for forming a stack of boards having a plurality of superimposed layers of elongated boards, in which selected layers are separated by stickers that are oriented transversely to the elongated dimension of the boards at desired sticker intervals along the length of the boards, said apparatus comprising:

a frame;

an elevated layer support surface disposed on the frame at a layer pickup station for supporting a layer of elongated boards thereon;

a layer handling means movably mounted on the frame for sequentially (1) moving upward at the layer pickup station from beneath the layer support surface to an elevation above the layer support surface to lift a layer of boards from the layer support surface; (2) moving the lifted layer from the pickup station to a layer stacking station; (3) moving downward and depositing the lifted layer at the layer stacking station on a preceding layer; and (4) returning from the layer stacking station in preparation for handling a succeeding layer;

a sticker magazine means adjacent the frame for storing a plurality of stickers;

elongated sticker indexing conveyor means mounted on the frame between the sticker magazine means and a plurality of spaced sticker stations corresponding to the desired sticker intervals for receiving a plurality of stickers from the sticker magazine means and distributing the stickers individually to the spaced sticker stations beneath the layer support surface;

sticker transfer means mounted on the frame having sticker lifting means responsive to the movement of the layer handling means for lifting the stickers from the elongated conveyor and pivoting the stickers upward and laterally to sticker transfer positions in which the stickers are positioned transverse to the elongated dimension of the boards; and sticker holding means associated with the layer handling means for moving in an upward path in response to the upward movement of the layer handling means for receiving and lifting the stickers from the sticker transfer positions and carrying the stickers underneath the lifted layer in response to the movement of the layer handling means from the pickup station to the layer stacking station and depositing the stickers on the preceeding layer to separate the lifted layer from the preceeding layer on the stack.

14. The lumber stacking apparatus as defined in claim 13 wherein the sticker lifting means includes end supports that are pivotally mounted for engaging the stickers at their ends and for removing the stickers from the elongated conveyor and pivoting the stickers upward and laterally into the upward path of the sticker holding means.

15. The lumber stacking apparatus as defined in claim 13 wherein the sticker holding means includes supports affixed to the layer handling means for movement therewith that engage and support the stickers underneath the lifted layer.

* * * * *